Patented May 30, 1939

2,160,560

UNITED STATES PATENT OFFICE 2,160,560

DECORATION OF GLASS AND CERAMIC SHEETS, TILES, AND OTHER PRODUCTS

Frank Dean Parkinson, Blackpool, England

No Drawing. Application March 30, 1938, Serial No. 199,019. In Great Britain March 2, 1937

8 Claims. (Cl. 41—26)

This invention has reference to the decoration of glass and ceramic sheets, tiles and other products, the object being to provide the articles with mottled, marbled, crinkled or patterned surfaces.

According to the invention, the surface of the product to be treated, first having been chemically cleaned, is coated with a film preferably of a waxy or greasy or resinous nature and a suspension of ground or powdered enamels, glazes, glassy solids or stains in a liquid, which is not miscible, or only slightly so, with the film, is then applied to the surface and drops flocculate or coalesce into patches or groups of a contour or shape, height and size or distribute themselves more or less evenly according to the extent to which parts of the film are wetted by the suspension liquid. The product is then fired so as to volatilize the film and fuse the suspensions.

The film may be applied to the whole or any part of the surface of the product by brushing, spraying, sponging, stippling or printing (as by means of transfers), and the suspension may be applied by spraying in the form of a fine mist over the whole or any part of the surface of the product or of the film applied thereto.

Among materials suitable for use in forming the films, the following have been found to be satisfactory: shellac, Canada balsam and numerous natural and synthetic resins, all in appropriate solvents, and waxes emulsified in water.

The effect produced by the treatment in the finished product may be altered in various ways. For instance, alteration may be attained by variation of the extent to which the surface is coated with the film, or the completeness or dispersion of such coating; variation of the amount of suspension applied; variation of the surface tension between the surface to be treated and the film, and between the film and the suspension; variation of the amount of "wetting" or emulsifying agent in the film or the suspension, or both; variation in the number and distribution of dry or wet particles on the surface to be treated, or of the film; variation of the moisture, gas or grease or smoke adsorbed on the surface to be treated; variation of the particle size, colour, fusibility or concentration of the ground enamels, glazes or stains in suspension; or variation of the volatility of the liquid carrying the enamels or stains.

The interfacial tension between the film and the suspensions may be varied, before complete evaporation has taken place, by spraying over such parts as desired with further volatile liquids differing from the dispersion medium in surface tension value and not immiscible with it. Such liquids should be inert towards the film, or at least nearly so.

In other instances, variation in effect may be obtained by successively applying, onto the film, suspensions in which like or unlike solid phases are separately dispersed in liquids which differ from each other in surface tension values and which are not miscible or are only very incompletely miscible.

The mottled appearance may be substantially even throughout a treated surface, or it may be varied in different parts of the surface so as to give, in addition to the mottling, a patterned effect.

Multi-coloured effects may be produced by applying coatings of film or films over the whole or parts of the surface after the dispersion medium has completely evaporated. These coatings may differ between themselves in composition and may provide varying degrees of surface tension from part to part over a given area. Suspensions, of like or unlike composition, are now sprayed over the same and drops falling on the film-coated areas, which may be varyingly distributed, flocculate or coalesce or otherwise distribute themselves into a formation not coincident with those lying beneath them. Thus, designs may be produced, for instance, in which successive layers of drops possess contrasting or varying lenticular or other contours or shapes, so that one pattern may be wholly or mainly discernible from one angle of vision and another pattern from another angle.

Thus multicoloured effects on clear or opaque glass may be obtained, for example, by coating chemically clean glass to a predetermined design or pattern with a viscous solution of a resin dammar or colophony, for instance in an essential oil (cloves or lavender or rosemary) diluted with a volatile solvent (as benzol) to the thickest consistency at which it is sprayable. The solution is applied by spraying over a mask or stencil, giving a shaded or "dying-away" effect, for instance, on the glass. This provides a varied degree of surface tension over the surface of the glass. When dry, a suspension in water of coloured frit or glaze is sprayed evenly over the whole surface of the film and glass, and a pattern takes shape by reason of the variations in the interfacial tension between the film-glass surface and the dispersion medium over different parts of the sprayed area. The glass is fired and the process repeated for the next colour, the pattern formed by the coating film being varied. The suspension in water (preferably of different colour) is again sprayed evenly over the whole surface, and re-fired.

The method of applying the frit or glaze may be varied by blowing it in a fine cloud over the whole or parts of the film-glass surface, and then directing against that surface a spray of water or other liquid having high surface-tensional value, preferably from a vertical direction. In this way the type or colour of the frit or glaze may be more easily varied from part to part of the surface of the glass. Coloured glazes may be applied directly onto the chemically clean surface of the glass, before any film is applied. Where the glazes are covered by the film, they will not, of course, flocculate.

The intermediate firings may be omitted, but in such cases better results are obtained by using frits or glazes of differing fusibilities and composition in each successive application.

What I claim is:

1. The method of decorating glass and ceramic products, which consists in first chemically cleaning the product, then coating the cleaned product surface with a film of viscous solution of resin in an essential oil diluted with a volatile solvent, thereafter spraying upon said film a solid phase suspension liquid not freely miscible therewith so that drops of the suspension liquid will flocculate or coalesce into patches or group areas distributing themselves over the film in varied shapes, heights and sizes according to the extent to which parts of the film are wetted by said suspension liquid, and finally firing the product to volatilize the film and fuse the distributed suspension into the surface of the product.

2. The method of decorating glass and ceramic products according to claim 1 wherein the film is applied to part of the surface of the product and the suspension liquid is applied both to parts of the surface which are film coated and to uncoated parts thereof.

3. The method of decorating glass and ceramic products according to claim 1 wherein the film is applied to part of the surface of the product and the suspension liquid is applied only to those parts of the surface which are film coated.

4. The method of decorating glass or ceramic products according to claim 1 wherein the suspension liquid referred to is evaporated and further film coating and solid phase suspension liquid is appled before the firing.

5. The method of decorating glass or ceramic products according to claim 1 wherein, before complete evaporation of the suspension liquid, there is applied a volatile liquid differing in surface tension value from and miscible with said suspension liquid but substantially inert towards the film.

6. The method of decorating glass or ceramic products according to claim 1, wherein solid phase suspension liquids which differ in surface tension value and are substantially immiscible are successively applied.

7. The method of decorating glass or ceramic products according to claim 1, wherein the film is applied in the form of a pattern, and the solid phase suspension liquid is applied over the film coated pattern and over parts of the product surface that are not so coated, another film formed pattern applied and a solid phase suspension liquid applied and the product then fired.

8. The method of decorating glass or ceramic products according to claim 1, wherein the film is applied in the form of a pattern, and the solid phase suspension liquid is applied over the film coated pattern and over parts that are not so coated, the product fired, another film formed pattern applied and a solid phase suspension liquid applied and the product refired.

FRANK DEAN PARKINSON.